United States Patent [19]

Okada

[11] Patent Number: 5,898,521
[45] Date of Patent: Apr. 27, 1999

[54] LCD PROJECTOR

[75] Inventor: Takehiro Okada, Ibaraki, Japan

[73] Assignee: Matsushita Electric Industrial Co., Ltd., Osaka, Japan

[21] Appl. No.: 08/745,778

[22] Filed: Nov. 8, 1996

[30] Foreign Application Priority Data

Nov. 17, 1995 [JP] Japan .................................. 7-299506

[51] Int. Cl.⁶ .................................................. G02B 5/30
[52] U.S. Cl. .......................... 359/487; 359/485; 359/496; 349/5; 349/9; 353/20; 353/81
[58] Field of Search .................................. 359/487, 495, 359/496, 497, 485; 349/5, 8, 9; 353/20, 81

[56] References Cited

U.S. PATENT DOCUMENTS

| | | | |
|---|---|---|---|
| 5,272,496 | 12/1993 | Nicolas et al. | 353/20 |
| 5,295,018 | 3/1994 | Konuma et al. | 359/487 |
| 5,381,278 | 1/1995 | Shingaki et al. | 359/495 |
| 5,570,109 | 10/1996 | Usui et al. | 349/5 |
| 5,689,315 | 11/1997 | Fushimi et al. | 349/5 |

FOREIGN PATENT DOCUMENTS

| | | | |
|---|---|---|---|
| 63-15225 | 1/1988 | Japan . | |
| 5-181090 | 7/1993 | Japan | 359/495 |
| 5323236 | 12/1993 | Japan . | |

*Primary Examiner*—Cassandra Spyrou
*Assistant Examiner*—Darren E. Schuberg
*Attorney, Agent, or Firm*—Stevens, Davis, Miller & Mosher, L.L.P.

[57] ABSTRACT

Light from a light source is divided into P-and S-polarized beams by means of a polarizing beam splitter and converted into the same polarized wave. Two polarized waves are incident on a liquid crystal panel symmetrically at the same angle on right and left sides. An integrator comprising two lens arrays is disposed before and behind these polarization converting elements, and therefore brightness can be uniformly increased with a simple construction while achieving space saving.

10 Claims, 9 Drawing Sheets

LCD PROJECTOR

BACKGROUND OF THE INVENTION

This invention relates to an LCD projector for enlarging and projecting an image on a liquid crystal panel and the like, and more particularly to an LCD projector in which a utilization efficiency of light emitted from a light source is enhanced to increase an optical output from the liquid crystal panel.

There have conventionally been put on the market an apparatus for enlarging and projecting an image on a liquid crystal panel by means of a light source such as a metal halide lamp, in which apparatus the light emitted from the light source is converged on the liquid crystal panel via a mirror or the like so that the image can be projected onto a screen through a projection lens. There are known two types of apparatus, that is, a single liquid crystal panel type (referred to as "a single panel type", hereinafter) and a three panel type in which three liquid crystal panels are used and color is separated and mixed by means of a dichroic mirror or the like. In both types, the light emerging from the projection lens is converted into polarized wave and, in general, only the vertically-polarized wave is allowed to appear on the screen surface in most cases.

Generally, a single panel type LCD projector comprises, as shown in FIG. 10, a projection lens 41, a field lens 42, a liquid crystal material 43, an incoming-side polarizer 44 and an outgoing-side polarizer 45, the incoming-side polarizer 44 cutting off half of the light.

A typical example of the three panel type LCD projector is disclosed in Japanese Patent Unexamined Publication No. 63-15225, for example. In this apparatus as well, half of the light (P-polarized light or S-polarized light) is cut off by the incoming-side polarizer as useless light. As for the means for utilizing both of the separated P- and S-polarized lights by converting one of the P- and S-polarized lights into the other of the P- and S-polarized lights, there has been proposed a polarization converting device shown in FIG. 8, for example. Further, as disclosed in Japanese Patent Unexamined Publication No. 5-323236, it has conventionally been proposed to improve brightness by converting only into the P-polarized light to project onto three liquid crystal panels by making use of the principle of the polarization converting device (FIG. 9).

FIG. 8 chiefly shows a polarization converting device section. A beam of randomly polarized light 26 emitted from a light source 25 is divided into two linearly-polarized beams, that is, into a P-polarized beam 27 and an S-polarized beam 28 by means of a polarizing beam splitter 29, and then converted into P-polarized beams 35, 36 by means of a few prisms 31, 32, 33 and 34, so that a lot of light is converted on a liquid crystal panel 37.

A polarization converting device section shown in FIG. 9 also converges lots of light on a liquid crystal panel surface by polarizing the light only in one direction by means of a polarizing beam splitter 37 and two prisms 38, 39.

In the LCD projector of either three or single panel type, the incoming-side polarizer and the outgoing-side polarizer are arranged before and behind the liquid crystal material, and the angle of rotary polarization of each picture cell is controlled in response to the voltage applied to the liquid crystal material.

According to systems in FIGS. 8 and 9 and the like, the light flux from the light source is converted only into the P-polarized light before arriving at the incoming-side polarizer to double a quantity of usable light which has been half of the light from the light source in the prior art. Therefore, it was possible to gain brightness, but many prisms should be combined for achievement, which resulted in a huge cost.

According to the system shown in FIG. 9, P-polarized lights from two directions are made incident on the panel by means of a combination of prisms and two kinds of lenses put on them, and therefore there were serious problems on positional accuracy of component parts, cost and the like.

Moreover, there have been proposed no systems for ensuring a uniform brightness of the liquid crystal panel surface even at the periphery thereof.

SUMMARY OF THE INVENTION

An object of the present invention is to solve the above-described problems of the prior art.

To solve the above problems, there is provided according to the present invention an LCD projector which is equipped with, in order to improve the brightness, a polarization converting means made up of a polarizing beam splitter for dividing a beam of randomly polarized light from a light source into linearly-polarized beams, that is, into a first P-polarized beam and an S-polarized beam, a half wave plate for turning the S-polarized beam in the same direction as the axis of polarization of the first P-polarized beam, and a reflection means for reflecting the second P-polarized beam turned substantially through 90 degrees by the half wave plate in the same direction as the first P-polarized beam emerging from the beam splitter, the polarization converting means being arranged in such a manner that the second P-polarized beam emerging from the reflecting means and the first P-polarized beam are input to the liquid crystal panel symmetrically at the same angle so as to illuminate the liquid crystal panel uniformly. This construction has the effects of converting the P- and S-polarized beams emitted from the light source into the P-polarized beam alone and inputting the light of the same level to all over the liquid crystal panel surface with respect to the lateral direction.

Further, there is provided according to the present invention an LCD projector in which, in order to make the brightness of the panel uniform even at the periphery thereof, two lens arrays are disposed in front of and behind the polarization converting means to uniformly disperse the light. With this construction, the quantity of light at the periphery of the liquid crystal panel can be increased and lots of light fluxes can be input uniformly, and therefore it is possible to obtain a bright LCD projector.

According to an aspect of the present invention, there is provided an LCD projector in which a first lens array comprising integrated lenses for dividing the light flux from the light source into plural beams and a second lens array opposed to the first lens array for enlarging the light flux are disposed on the input and output sides of the polarization converting means. With this construction, the brightness of the liquid crystal panel can be uniformly assured even at the periphery thereof and the space saving is achieved owing to the arrangement in front of and behind the input and output sides of the polarization converting means.

According to another aspect of the present invention, there is provided an LCD projector in which the polarization converting means is made up of a polarizing prism having a surface for separating a beam of randomly polarized light into P- and S-polarized beams and a film half wave plate put on a surface thereof from which the S-polarized beam is output, and a reflector for reflecting the second P-polarized beam turned by the half wave plate. With this construction, an inexpensive polarization converting device can be obtained and the incidence on the liquid crystal panel at the same angle can be easily adjusted by the reflector.

According to still another aspect of the present invention, there is provided an LCD projector in which the polarization converting means is made up of a first prism for separating a beam of randomly polarized light into P- and S-polarized beams, and a second prism having a polarizing surface for reflecting the second P-polarized beam turned by a half wave plate which is put between the first and second prisms in contact therewith to form an integral body. With this construction, the prism is minimized in size, and therefore it is possible to obtain a polarization converting means which is small, easy to handle as a block and inexpensive.

According to a different aspect of the present invention, there is provided an LCD projector in which the polarization converting means is made up of a polarizing prism having a surface for separating a beam of randomly polarized light into P- and S-polarized beams and a film half wave plate put on a surface thereof from which the S-polarized beam is output, a reflector for reflecting the second P-polarized beam turned by the half wave plate, and a cooling means such as a fan disposed substantially below the half wave plate and the reflector. With this construction, temperature rise of the half wave plate is suppressed, and therefore it is possible to use a high power light source.

DESCRIPTION OF THE PREFERRED EMBODIMENTS

Figure 1:
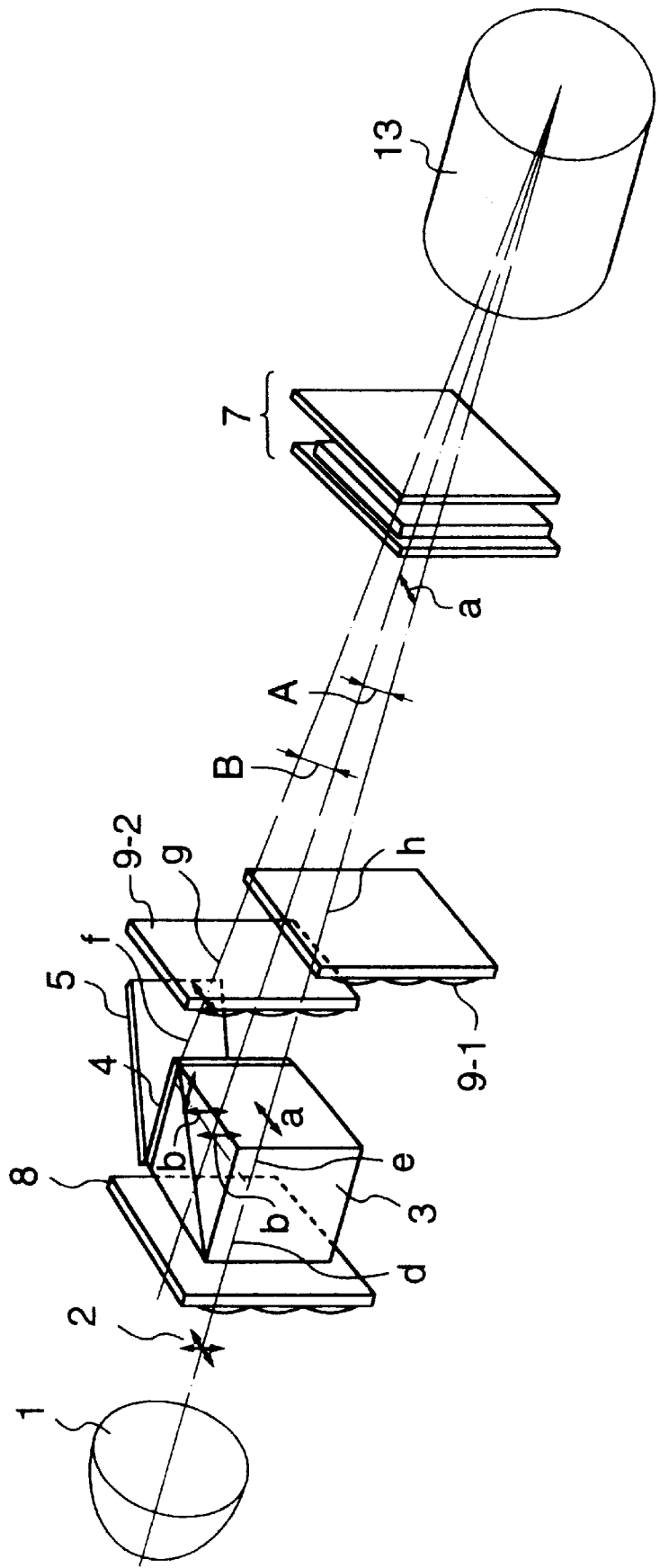
FIG. 1 is a perspective view of an optical system of an LCD projector according to an embodiment of the present invention.
Figure 2:
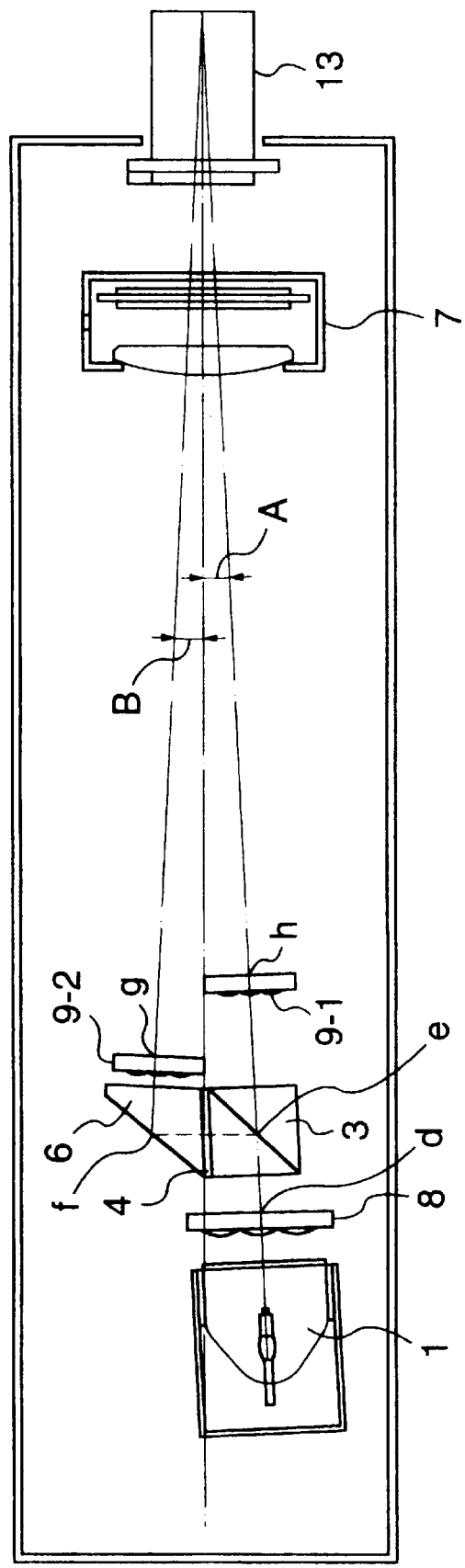
FIG. 2 is a top plan view of the LCD projector of FIG. 1.
Figure 3:
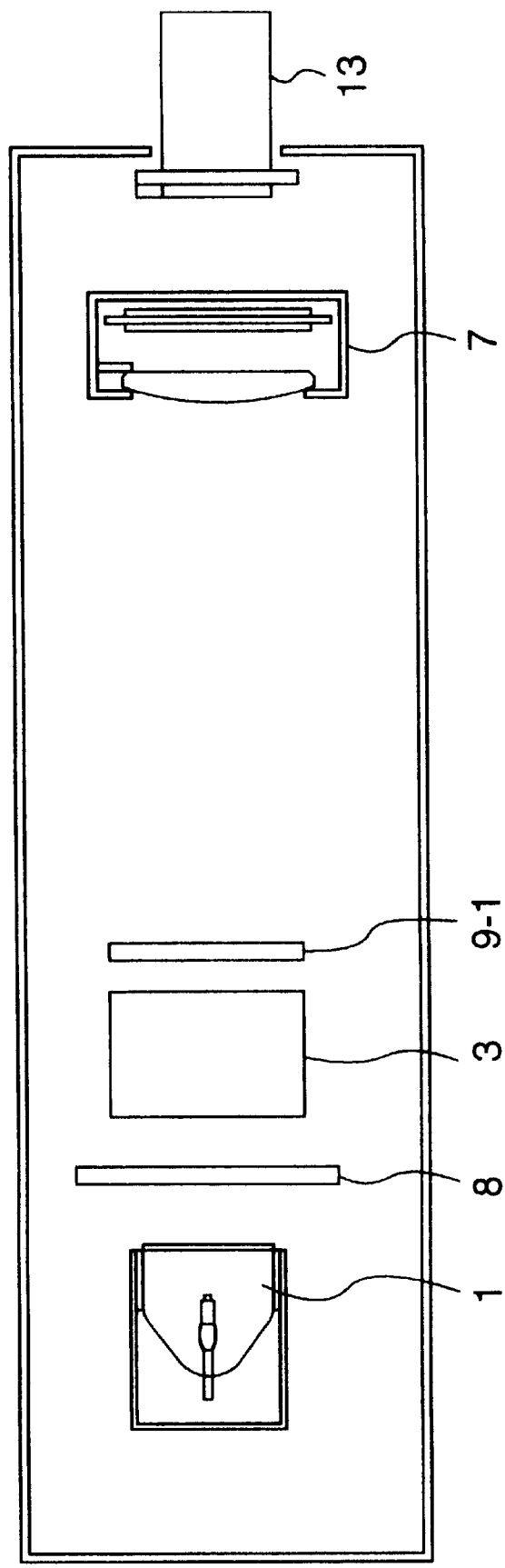
FIG. 3 is a front view of the LCD projector of FIG. 1.

FIG. 1 is a perspective view of an optical system of a single panel type LCD projector according to an embodiment of the present invention, FIG. 2 is a top plan view thereof, and FIG. 3 is a front view thereof.

Light flux emitted from a light source 1 formed integral with a reflector is made incident on a polarizing beam splitter 3 in the form of P- and S-polarized beams 2 and separated into the P-polarized beam shown by an arrow mark a and the S-polarized beam shown by an arrow mark b which is perpendicular to the P-polarized beam.

Figure 4:
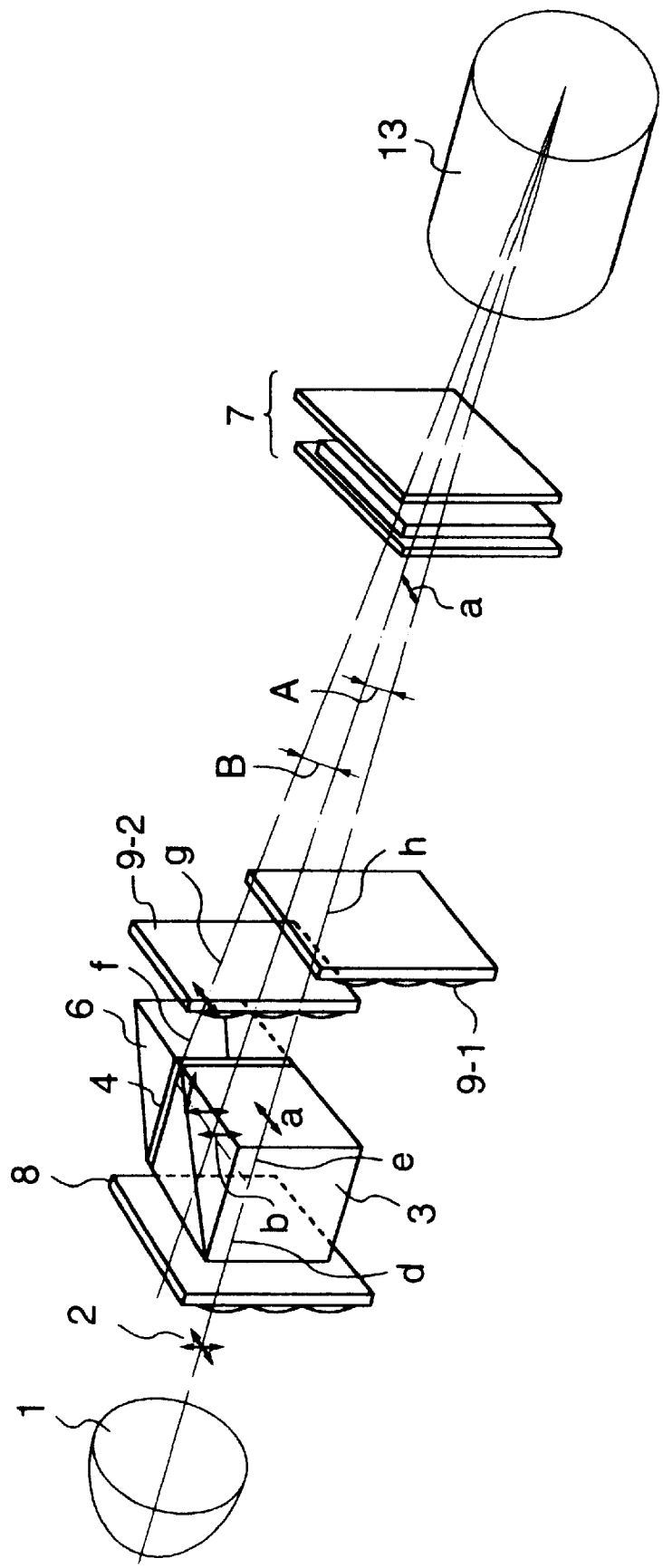
FIG. 4 is a perspective view of an optical system of an LCD projector according to an embodiment of the present invention.

The reference numeral 4 denotes a half wave plate which turns the S-polarized beam substantially through 90 degrees to convert it into the P-polarized beam. The light flux c thus converted into the P-polarized beam (as shown by a transverse arrow mark) is reflected by a reflector 5 or a reflection prism 6 (see FIG. 4) so that the same polarized component as the initially separated P-polarized beam is conducted onto the surface of a liquid crystal panel 7.

Further, FIG. 1 shows another embodiment in which two lens arrays 8 and 9-1, 9-2 (first and second lens arrays) are provided on light incoming and outgoing sides of this group of polarization converting elements. The light flux emitted from the light source is first divided into plural beams by the lens array 8 and, after being enlarged by the lens arrays 9-1, 9-2, superimposed on a display area of the liquid crystal panel 7, and therefore there can be achieved an illumination of high uniformity. Since the lens arrays 8, 9 should be provided at a fixed distance from each other, the above-described polarization converting elements are formed between them for the space saving.

In FIGS. 1 to 5, the polarized beams (shown by arrows c, d in the drawings), which have been subjected to polarization conversion, are each made incident on the surface of the liquid crystal panel 7 at angles A, B with respect to the vertical axis. In the present invention, the reflector 5 or the reflection prism 6 is used to set the incidence angles to satisfy a condition of A=B.

Figure 7:
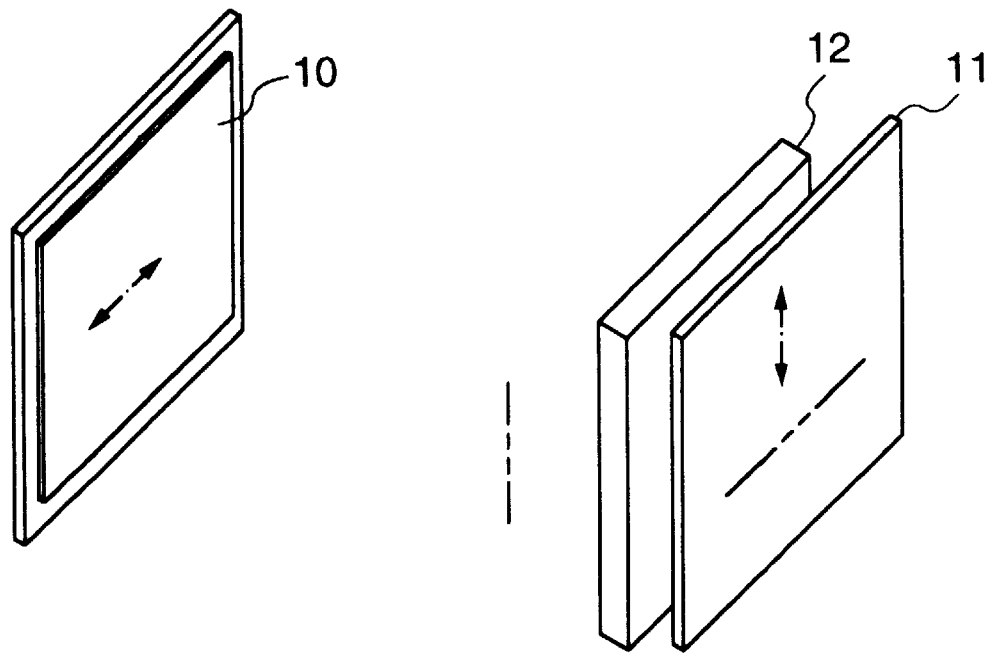
FIG. 7 is a perspective view showing a construction of a liquid crystal panel.
Figure 9:
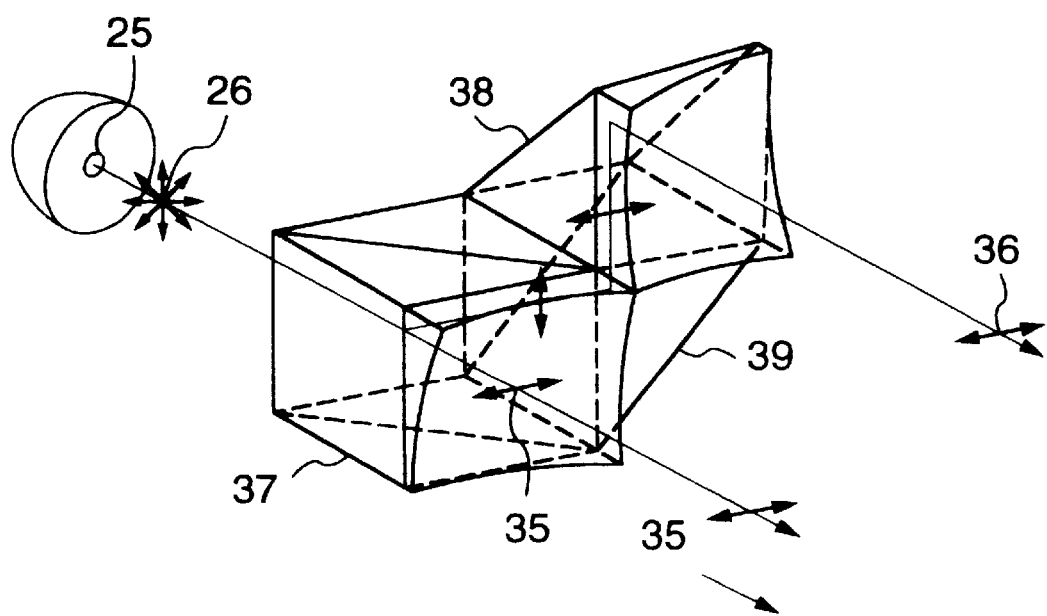
FIG. 9 is a perspective view showing a principle of a polarization converting device in a conventional LCD projector.
Figure 8:
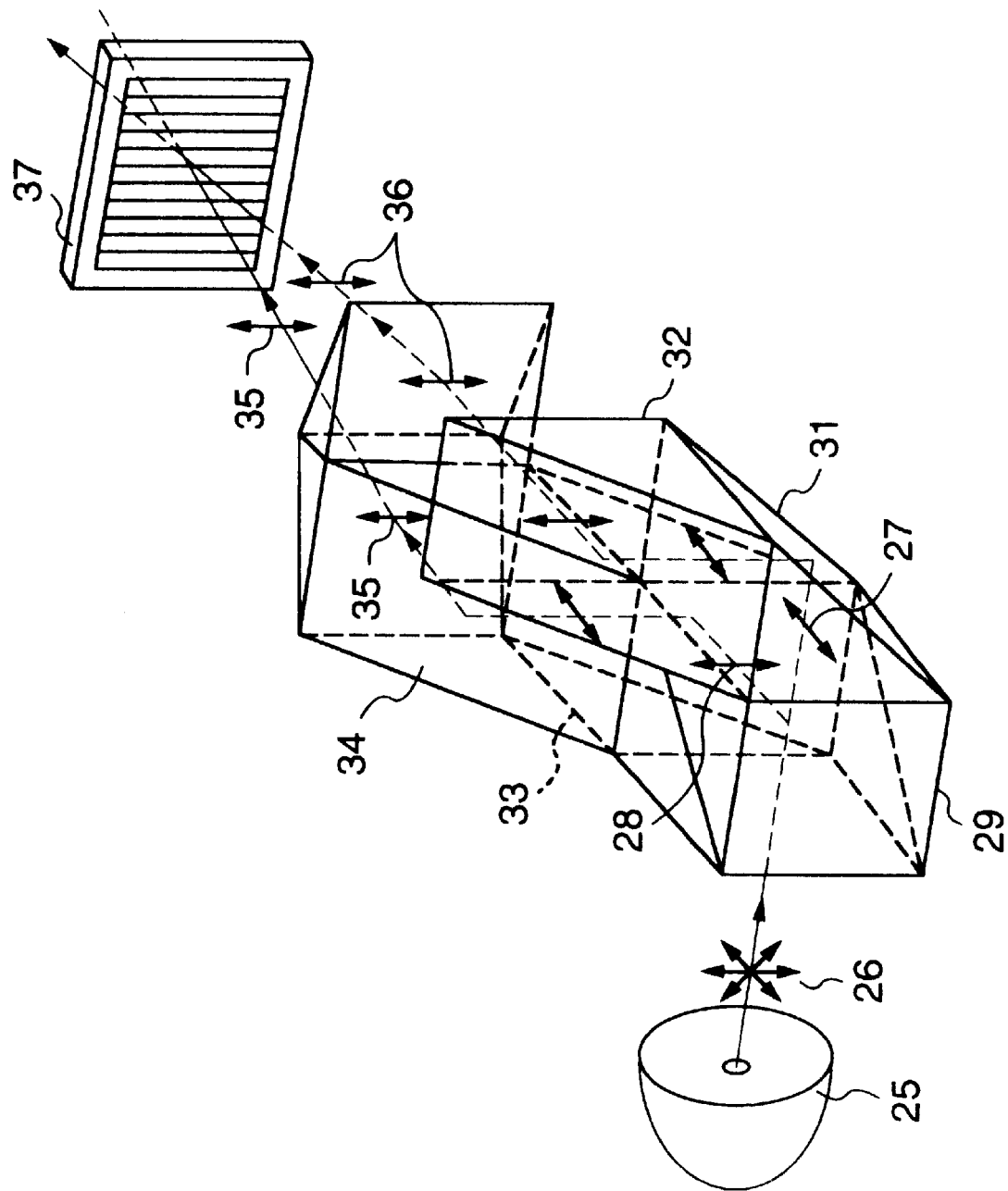
FIG. 8 is a perspective view showing a principle of a polarization converting device in a conventional LCD projector.
Figure 10:
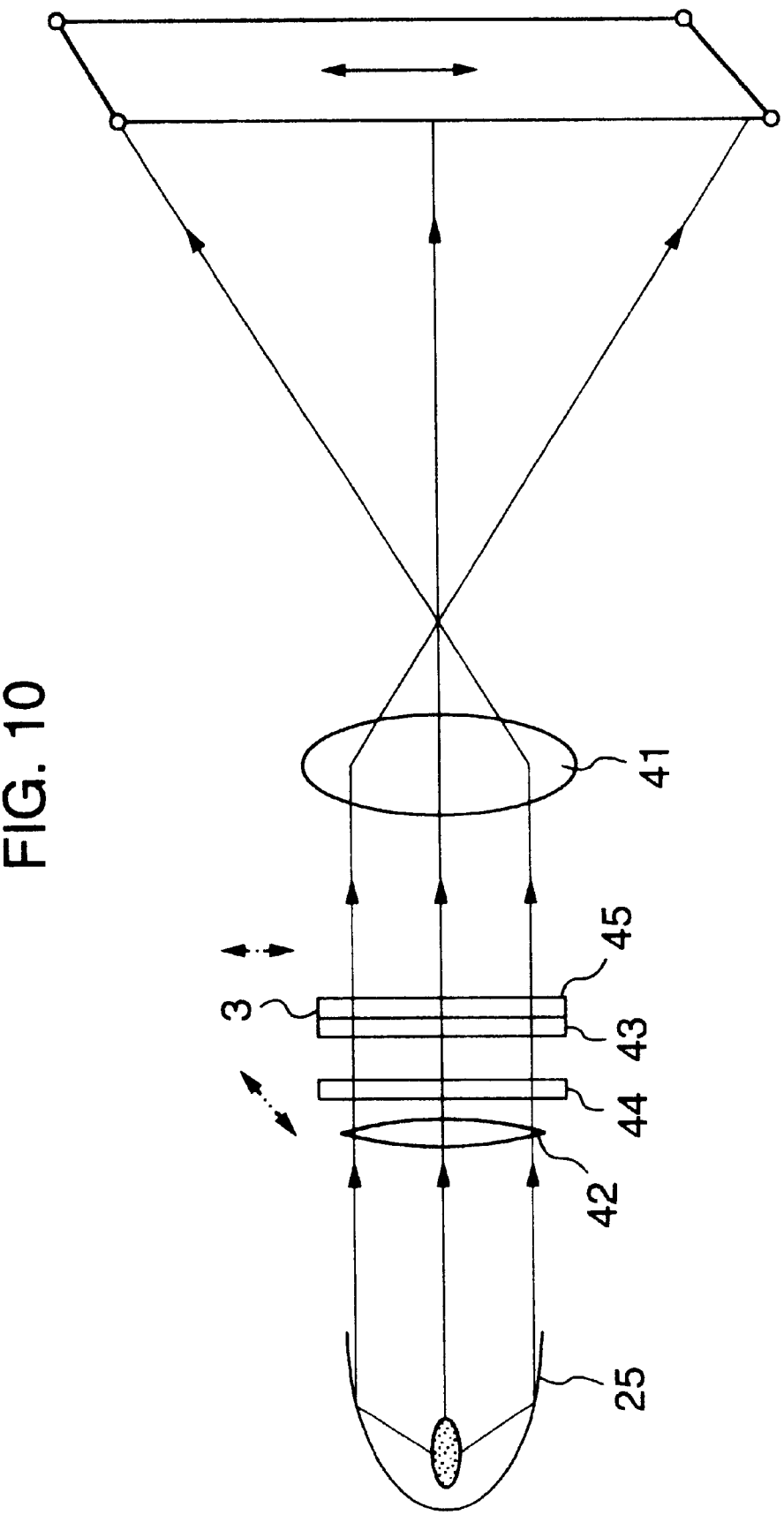
FIG. 10 is a front view showing an optical system of a conventional LCD projector.

FIG. 7 shows a construction of the liquid crystal panel 7 which comprises incoming and outgoing polarizers 10, 11 and a liquid crystal material 12. In general, the incoming-side polarizer 10 transmits light polarized in a direction shown by an arrow mark ⇆ in the drawing, the liquid crystal material 12 rotates a plane of polarization through 90° to convert only into a vertically-polarized component, and the outgoing-side polarizer 11 transmits only a vertically-polarized component. The light flux transmitted through the liquid crystal panel 7 is enlarged by a projection lens 13 to be projected onto a screen.

Figure 5:
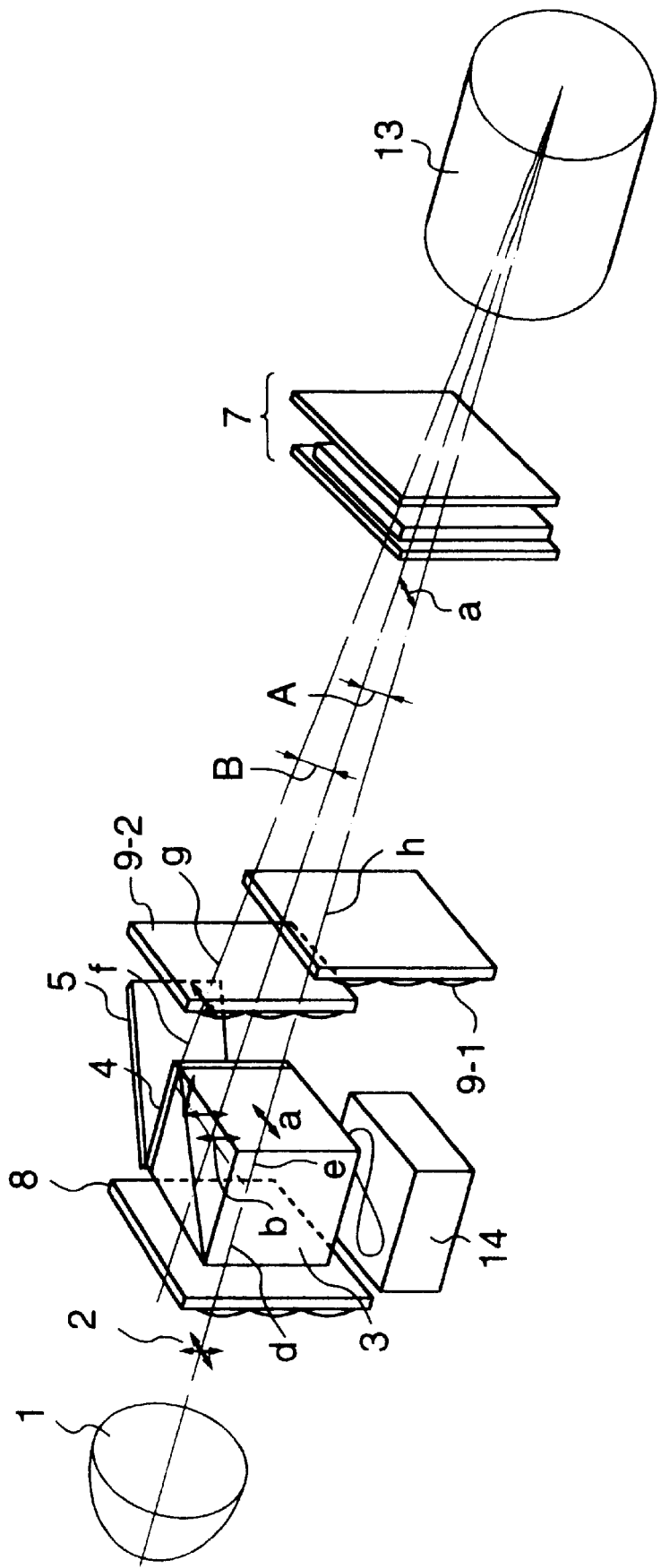
FIG. 5 is a perspective view of an optical system of an LCD projector according to an embodiment of the present invention.
Figure 6:
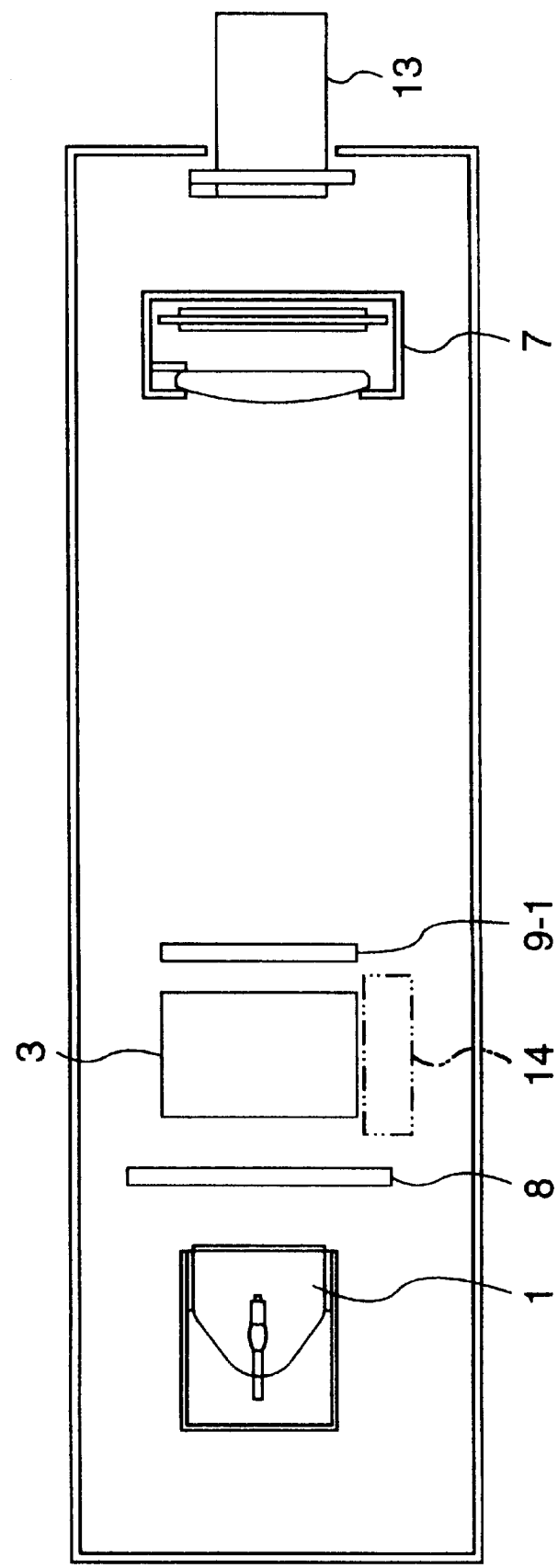
FIG. 6 is a front view of an optical system of an LCD projector according to an embodiment of the present invention.

Moreover, a different embodiment is shown in FIGS. 5 and 6. In this embodiment, the construction is the same as that of FIG. 1 except that a cooling fan 14 is arranged below the reflector 5 and the half wave plate 4 as seen from the perspective view.

This construction has an effect of preventing temperature rise of the half wave plate 4 which might be caused in the event of the output from the light source being increased.

In the embodiments shown in FIGS. 1 to 5, a distance (along beams d~e~h) between the first lens arrays 8 and the second lens arrays 9-1 and a distance (along beams d~e~f~g) between the first lens arrays 8 and the second lens arrays 9-2 are substantially equal to each other so that an image of arc from the light source 1 is caused by a plurality of lenses of the first lens arrays to provide image formation on the respective lens arrays 9-1 and 9-2.

As has been described above, according to the present invention, although a half of a quantity of light emitted from the light source has been cut off by the polarizer in the prior arts, it becomes possible to convert randomly-polarized lights into the same polarized light before being incident on the polarizer with a simple and inexpensive structure, and it is also possible to make incidence angles of lights incident on the surface of the liquid crystal panel symmetrical with each other. Further, the two lens arrays are formed in the spaces before and behind the polarization converting device, and therefore there can be obtained means for making brightness of the panel uniform even at the periphery thereof while achieving space saving. Moreover, it is possible to use cooling means to prevent the half wave plate, which is made of a film, from undergoing a temperature rise to break.

What is claimed is:

1. A projector comprising:

a light source for emitting a beam of randomly polarized light;

a panel for controlling transmission of the randomly polarized light emitted from said light source;

a projection lens for enlarging and reducing an image formed by the light transmitted through said panel;

polarization converting means for converting the randomly polarized light into light having a first polarization state, said polarization converting means comprising:

(i) a polarizing beam splitter for dividing said beam of randomly polarized light from said light source into a first beam having said first polarization state and a beam having a second polarization state;

(ii) a half wave means for turning said beam having said second polarization state into a second beam having said first polarization state; and (iii) reflection means for reflecting the second beam into a same direction as said first beam:

a first lens array comprising a first plurality of lenses; and a second lens array comprising a second plurality of lenses;

wherein said polarization converting means is disposed between said first lens array and said second lens array, and wherein said polarization converting means, said first lens array and said second lens array are constructed to cause the second beam outgoing from said reflection means and said first beam to be made incident on said panel at angles having equal magnitude and opposite orientations with respect to an axis of said panel so as to illuminate the panel uniformly.

2. A projector according to claim 1, wherein:

said first plurality of lenses of said first lens array are integrated lenses for dividing the randomly polarized light beam from the light source into plural beams; and said second plurality of lenses of said second lens array correspond to said first plurality of lenses of said first lens array, are lenses for enlarging said first and second beams; and said first and second lens arrays are disposed on incoming and outgoing sides of the polarization converting means.

3. A projector according to claim 2, wherein:

the polarizing beam splitter comprises a polarizing prism having an interface where said beam of randomly polarized light is separated into said first beam having said first polarization state and said beam having said second polarization state;

said half wave means comprises a film half wave plate put on a surface of said polarizing prism from which said beam having said second polarization state outgoes;

said reflecting means comprises a reflector for reflecting the second beam emanating from said film half wave plate; and said polarization converting means further comprises cooling means, disposed substantially below said film half wave plate and said reflector, for cooling said polarization converting means.

4. A projector according to claim 3, wherein said cooling means comprises a fan.

5. A projector according to claim 1, wherein:

the polarizing beam splitter comprises a polarizing prism having an interface where said beam of randomly polarized light is separated into said first beam having said first polarization state and said beam having said second polarization state;

the half wave means comprises a film half wave plate put on a surface of said polarizing prism from which said beam having said second polarization state outgoes; and the reflecting means comprises a reflector for reflecting the second beam which emanates from said film half wave plate.

6. A projector according to claim 1, wherein:

the polarizing beam spliter comprises a first prism for separating said beam of randomly polarized light into said first beam having said first polarization state and said beam having said second polarization state;

said reflecting means comprises a second prism having a polarizing surface for reflecting the second beam emanating from said half wave means; and said half wave means comprises a half wave plate which is closely put between said first and second prisms in an integral manner.

7. A projector according to claim 1, wherein:

said first polarization state is a P-polarization state; and said second polarization state is an S-polarization state.

8. A projector according to claim 1, wherein said panel comprises a liquid crystal panel.

9. A projector according to claim 1, wherein said first and second lens arrays are integrated lens arrays.

10. A projector according to claim 1, wherein said half wave means comprises a half wave plate.

* * * * *